(12) United States Patent
Thoreson

(10) Patent No.: US 11,617,293 B2
(45) Date of Patent: Apr. 4, 2023

(54) HITCH ASSEMBLY FOR A WORK VEHICLE

(71) Applicant: DEERE & COMPANY, Moline, IL (US)

(72) Inventor: Curtis P. Thoreson, Janesville, IA (US)

(73) Assignee: Deere & Company, Moline, IL (US)

( * ) Notice: Subject to any disclaimer, the term of this patent is extended or adjusted under 35 U.S.C. 154(b) by 508 days.

(21) Appl. No.: 16/816,594

(22) Filed: Mar. 12, 2020

(65) Prior Publication Data

US 2021/0282307 A1    Sep. 16, 2021

(51) Int. Cl.
*A01B 59/06*    (2006.01)
*B60D 1/48*    (2006.01)
*B60D 1/46*    (2006.01)
*B60D 1/24*    (2006.01)

(52) U.S. Cl.
CPC .......... *A01B 59/068* (2013.01); *A01B 59/066* (2013.01); *B60D 1/246* (2013.01); *B60D 1/465* (2013.01); *B60D 1/488* (2013.01)

(58) Field of Classification Search
CPC ... A01B 59/064; A01B 59/066; A01B 59/068; B60D 1/246; B60D 1/465; B60D 1/488
See application file for complete search history.

(56) References Cited

U.S. PATENT DOCUMENTS

| | | | | |
|---|---|---|---|---|
| 4,236,724 A | * | 12/1980 | Schillings | A01B 59/041 172/450 |
| 4,862,971 A | * | 9/1989 | Azzarello | A01B 59/041 172/450 |
| 4,919,215 A | * | 4/1990 | Lee | A01B 59/041 172/450 |
| 6,148,927 A | * | 11/2000 | Hoffart | A01B 59/064 172/439 |
| 6,896,088 B2 | * | 5/2005 | Dahl | B60W 10/10 180/367 |
| 8,347,976 B2 | * | 1/2013 | Bernhardt | A01B 59/062 172/444 |
| 11,109,522 B2 | * | 9/2021 | Evrard | A01B 59/002 |

FOREIGN PATENT DOCUMENTS

FR    2857821 A1 *  1/2005    ........... A01B 59/062

* cited by examiner

*Primary Examiner* — Gary S Hartmann
(74) *Attorney, Agent, or Firm* — Michael Best & Friedrich LLP

(57) ABSTRACT

A work vehicle includes a first ground-engaging implement and a second ground-engaging implement connected to a chassis. The first ground-engaging implement moves within a first movement envelope with respect to the chassis, and the second ground-engaging implement moves within a second movement envelope with respect to the chassis. A lift arm is connected to the chassis and positioned between the first and second ground-engaging implements. The lift arm moves along a range of movement between a raised position and a lowered position. The lift arm is entirely positioned outside both of the first movement envelope and the second movement envelope within the entire range of movement between the raised position and the lowered position, such that the lift arm is permitted to move along the entire range of movement between the raised position and the lowered position without abutting the first movement envelope or the second movement envelope.

20 Claims, 9 Drawing Sheets

HITCH ASSEMBLY FOR A WORK VEHICLE

BACKGROUND

The present disclosure relates to work vehicle having a front hitch configuration.

SUMMARY

In some embodiments, the disclosure provides a work vehicle including a chassis having a first side, a second side opposite the first side, a front portion and a rear portion, and a prime mover connected to the chassis. A first ground-engaging implement is connected to the first side of the chassis and moves within a first movement envelope with respect to the chassis. A second ground-engaging implement is connected to the second side of the chassis and moves within a second movement envelope with respect to the chassis. A lift arm includes a first end portion connected to the front portion of the chassis and positioned between the first ground-engaging implement and the second ground-engaging implement, and a second end portion spaced from the front portion of the chassis. The first end portion of the lift arm defines a first width and the second end portion of the lift arm defines a second width. The second width is greater than the first width. The lift arm is moveable along a range of movement between a raised position and a lowered position. The lift arm is entirely positioned outside of the first movement envelope within the entire range of movement between the raised position and the lowered position, such that the first ground-engaging implement is permitted to move uninhibited by the lift arm within the first movement envelope with respect to the chassis. The lift arm is permitted to move along the entire range of movement between the raised position and the lowered position without abutting the first movement envelope. The lift arm is entirely positioned outside of the second movement envelope within the entire range of movement between the raised position and the lowered position, such that the second ground-engaging implement is permitted to move uninhibited by the lift arm within the second movement envelope with respect to the chassis. The lift arm is permitted to move along the entire range of movement between the raised position and the lowered position without abutting the second movement envelope.

In some embodiments, the disclosure provides a work vehicle including a chassis having a first side, a second side opposite the first side, a front portion and a rear portion, and a prime mover connected to the chassis. A first ground-engaging implement is connected to the first side of the chassis and moves within a first movement envelope with respect to the chassis. The first movement envelope defines a first volume adjacent the first side of the chassis. A second ground-engaging implement is connected to the second side of the chassis and moves within a second movement envelope with respect to the chassis, wherein the second movement envelope defines a second volume adjacent the second side of the chassis. A lift arm includes a first end portion connected to the front portion of the chassis and positioned between the first ground-engaging implement and the second ground-engaging implement, and a second end portion spaced from the front portion of the chassis. The first end portion of the lift arm defines a first width and the second end portion of the lift arm defines a second width. The second width is greater than the first width. The lift arm moves along a range of movement between a raised position and a lowered position. The lift arm is entirely outside of the first volume within the entire range of movement between the raised position and the lowered position, such that the first ground-engaging implement is permitted to move uninhibited by the lift arm within the first volume with respect to the chassis. The lift arm is permitted to move along the entire range of movement between the raised position and the lowered position without abutting the first volume. The lift arm is entirely outside of the second volume within the entire range of movement between the raised position and the lowered position, such that the second ground-engaging implement is permitted to move uninhibited by the lift arm within the second volume with respect to the chassis. The lift arm is permitted to move along the entire range of movement between the raised position and the lowered position without abutting the second volume.

In some embodiments the disclosure provides a work vehicle including a chassis having a first side, a second side opposite the first side, a front portion and a rear portion, and a prime mover connected to the chassis. A first ground-engaging implement is connected to the first side of the chassis and moves within a first movement envelope with respect to the chassis. A second ground-engaging implement is connected to the second side of the chassis and moves within a second movement envelope with respect to the chassis. A lift arm includes a first end portion connected to the front portion of the chassis and is positioned between the first ground-engaging implement and the second ground-engaging implement, and a second end portion spaced from the front portion of the chassis. The lift arm moves along a range of movement between a raised position and a lowered position. The lift arm is positioned entirely outside of the first movement envelope and entirely outside of the second movement envelope along the entire range of movement between the raised position and the lowered position. A first side link is connected to a first part of the second end portion of the lift arm and extends away from the chassis. The first side link engages a work implement and moves along a first side link range of movement. The first side link is positioned adjacent to and entirely outside of the first movement envelope along the entire first side link range of movement. A first actuator is connected to the chassis at a first end portion and is connected to the first side link at a second end portion. The first actuator moves along a first actuator range of movement to rotate the first side link and the lift arm about the chassis. The first actuator is positioned adjacent to and entirely outside of the first movement envelope along the entire first actuator range of movement. A second side link is connected to a second part of the second end portion of the lift arm and extends away from the chassis. The second side link engages the work implement and moves along a second side link range of movement. The second side link is positioned adjacent to and entirely outside of the second movement envelope along the entire second side link range of movement. A second actuator is connected to the chassis at a first end portion and is connected to the second side link at a second end portion. The second actuator moves along a second actuator range of movement to rotate the second side link and the lift arm about the chassis. The second actuator is positioned adjacent to and entirely outside of the second movement envelope along the entire second actuator range of movement. The first ground-engaging implement is permitted to move uninhibited by the lift arm, the first side link and first actuator within the first movement envelope, and the second ground-engaging implement is permitted to move uninhibited by the lift arm, the second side link and the second actuator within the second movement envelope.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
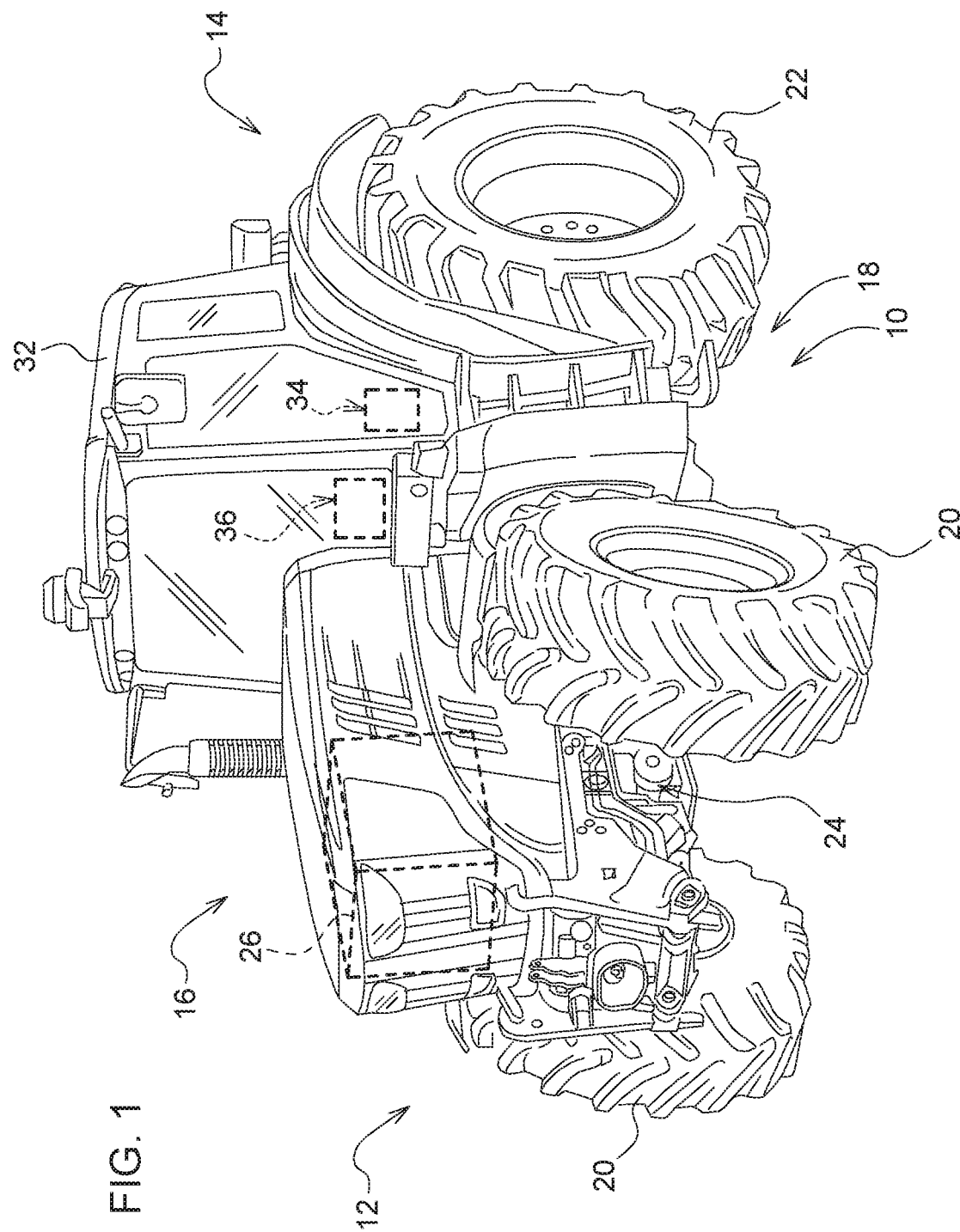
FIG. 1 is a perspective view of a work vehicle according to some embodiments.

FIG. 1 illustrates a work vehicle 10 including a front portion 12, a rear portion 14, a first side portion 16, a second side portion 18, front wheels 20, rear wheels 22, a chassis 24, a prime mover 26, a cab 32, a controller 34, and a user interface 36. The front wheels 20 are connected to the chassis 24 proximate the front portion 12 of the work vehicle 10. One of the front wheels 20 is positioned on the first side portion 16 and the other one of the front wheels 20 is positioned on the second side portion 18 of the work vehicle 10. The rear wheels 22 are connected to the chassis 24 proximate the rear portion 14 of the work vehicle 10. One of the rear wheels 22 is positioned on the first side portion 16 and the other one of the rear wheels 22 is positioned on the second side portion 18 of the work vehicle 10. While front wheels 20 and rear wheels 22 are illustrated, other ground-engaging implements, such as tracks, can be utilized.

The prime mover 26 is connected to the chassis 24 proximate the front portion 12 of the work vehicle. The prime mover 26 is configured to provide power to the front wheels 20 and/or the rear wheels 22 to thereby move the work vehicle 10 over a ground surface.

The cab 32 is connected to the chassis 24 proximate the rear portion 14 of the work vehicle 10. The controller 34 can be positioned in or near the cab 32. The controller 34 is electrically connected to the front wheels 20, the rear wheels 22 and the prime mover 26 to send and receive signals from the front wheels 20, the rear wheels 22 and the prime mover 26.

The user interface 36 is positioned in the cab 32 such that a user in the cab 32 can engage the user interface 36. The user interface 36 is electrically connected to the controller 34 to send signals to and receive signals from the controller 34.

Figure 2:
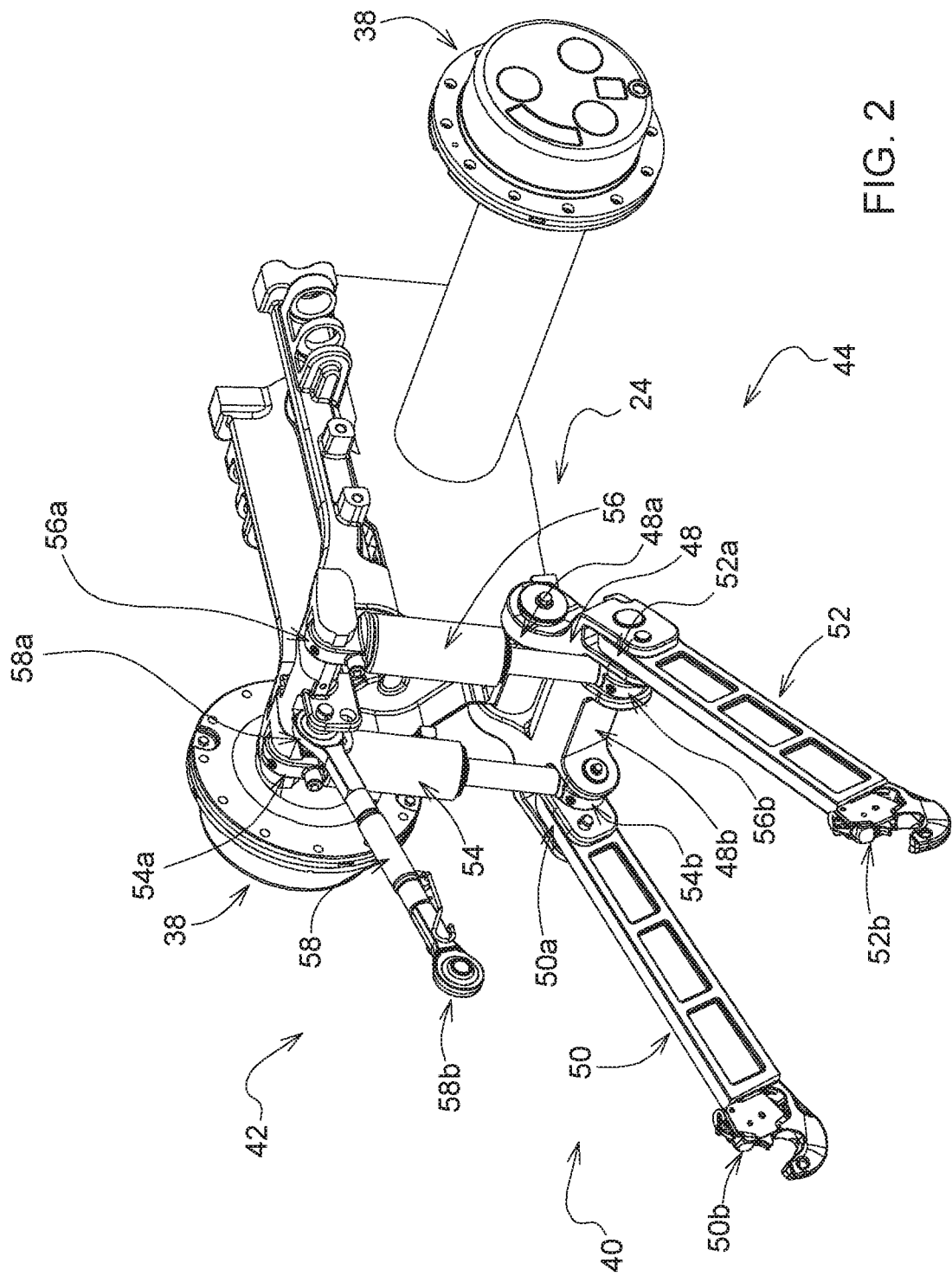
FIG. 2 is perspective view of a portion of the work vehicle.
Figure 3:
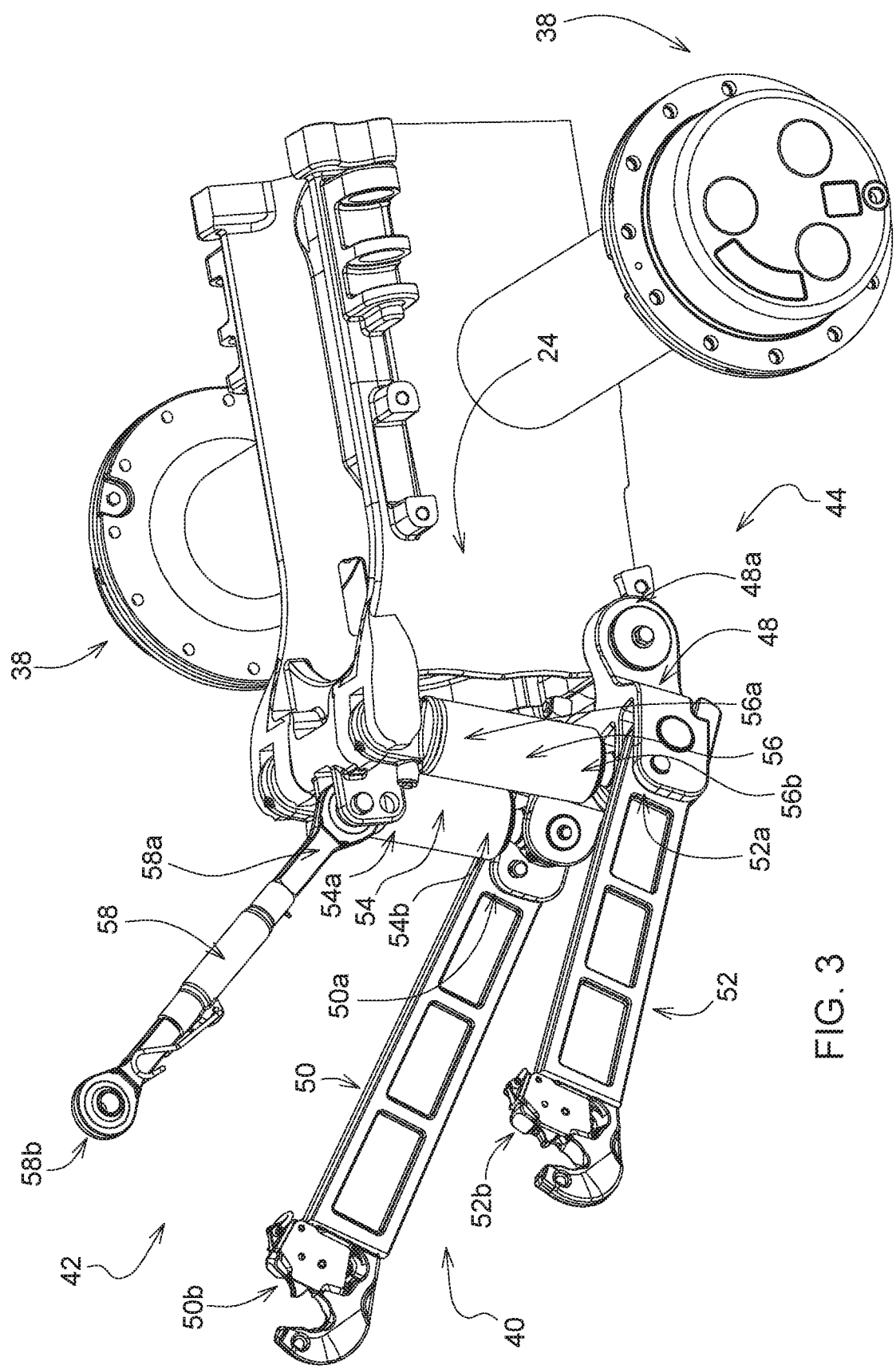
FIG. 3 is a perspective view of the portion of FIG. 2 shown in a first position.

FIGS. 2 and 3 illustrate front wheel hubs 38 and a hitch assembly 40 for use with the work vehicle 10. The front wheel hubs 38 are configured to engage and rotate the front wheels 20, and the illustrated hitch assembly 40 is connected to the front portion 12 of the work vehicle 10. In other embodiments, the hitch assembly 40 is connected to the rear portion 14 of the work vehicle 10.

FIG. 2 illustrates the hitch assembly 40 in a lowered position and FIG. 3 illustrates the hitch assembly 40 in a raised position. The hitch assembly 40 includes a first side 42 and a second side 44 opposite the first side 42. The first side 42 is substantially a mirror-image of the second side 44 in the illustrated embodiment. The first side 42 is positioned on the first side portion 16 of the work vehicle 10 and the second side 44 is positioned on the second side portion 18 of the work vehicle 10.

The hitch assembly 40 includes a lift arm 48, a first side link 50, a second side link 52, a first actuator 54, a second actuator 56, and an upper link 58. The lift arm 48 includes a first portion 48a connected to the chassis 24 and a second portion 48b spaced from the first portion 48a. The first portion 48a is configured to rotate with respect to the chassis 24. In some embodiments, one or more bearings are positioned between the first portion 48a and the chassis 24. The lift arm 48 is shown in a lowered position in FIG. 2 and a raised position in FIG. 3. The lift arm 48 has a range of movement between the lowered position and the raised position.

The first side link 50 includes a first portion 50a connected to the second portion 48b of the lift arm 48 and a second portion 50b spaced from the first portion 50a. The first portion 50a of the first side link 50 is inhibited from moving relative to the lift arm 48 such that the first side link 50 rotates with respect to the chassis 24 in response to the lift arm 48 rotating with respect to the chassis 24. The first side link 50 has a range of movement between the lowered position shown in FIG. 2 and the raised position shown in FIG. 3. The illustrated first side link 50 is linear, but other shapes and configurations are possible in other embodiments. The second portion 50b of the first side link 50 is configured to engage a work implement, such as a snow plow, planting equipment, tillage equipment, etc.

The second side link 52 includes a first portion 52a connected to the second portion 48b of the lift arm 48 and a second portion 52b spaced from the first portion 52a. The first portion 52a of the second side link 52 is inhibited from moving relative to the lift arm 48 such that the second side link 52 rotates with respect to the chassis 24 in response to the lift arm 48 rotating with respect to the chassis 24. The second side link 52 has a range of movement between the lowered position shown in FIG. 2 and the raised position shown in FIG. 3. The illustrated second side link 52 is linear, but other shapes and configurations are possible in other embodiments. The second portion 52b of the second side link 52 is configured to engage a work implement, such as a snow plow, planting equipment, tillage equipment, etc.

The first actuator 54 includes a first portion 54a connected to the chassis 24 and a second portion 54b connected to the second portion 48b of the lift arm 48. The first actuator 54 has an adjustable length and is configured to rotate the lift arm 48 about the chassis 24 by increasing and decreasing the length of the first actuator 54. The first actuator 54 is shown having a maximum length in FIG. 2 and a minimum length in FIG. 3. The first actuator 54 has a range of movement extending between the maximum length of FIG. 2 and the minimum length of FIG. 3. The first actuator 54 is moveable to any position between the positions shown in FIGS. 2 and 3.

The second actuator 56 includes a first portion 56a connected to the chassis 24 and a second portion 56b connected to the second portion 48b of the lift arm 48. The second actuator 56 has an adjustable length and is configured to rotate the lift arm 48 about the chassis 24 by increasing and decreasing the length of the second actuator 56. The second actuator 56 is shown having a maximum length in FIG. 2 and a minimum length in FIG. 3. The second actuator 56 has a range of movement extending between the maximum length of FIG. 2 and the minimum length of FIG. 3. The second actuator 56 is moveable to any position between the positions shown in FIGS. 2 and 3.

The first actuator 54 and the second actuator 56 are configured to operate together to pivot the lift arm 48 about the chassis 24 along the entire range of movement of the lift arm 48. Movement of the lift arm 48 about the chassis 24 moves the first and second side links 50 and 52 along the respective range of movement of the first and second side links 50 and 52. Any work implement connected to the second portions 50b and 52b of the first and second side links 50 is raised and lowered in response to movement of the first and second side links 50 and 52.

The upper link 58 includes a first portion 58a connected to the chassis 24 and a second portion 58b spaced from the first portion 58a. The second portion 58b is configured to connect to the work implement. In some embodiments, the upper link 58 has a variable length such that the upper link 58 can pivot the work implement about the second portions 50b and 52b of the first and second side links 50 and 52. In other embodiments, the upper link 58 has a fixed length and provides a third point of attachment between the work implement and the chassis 24 to thereby provide increased stability of the work implement.

Figure 4:
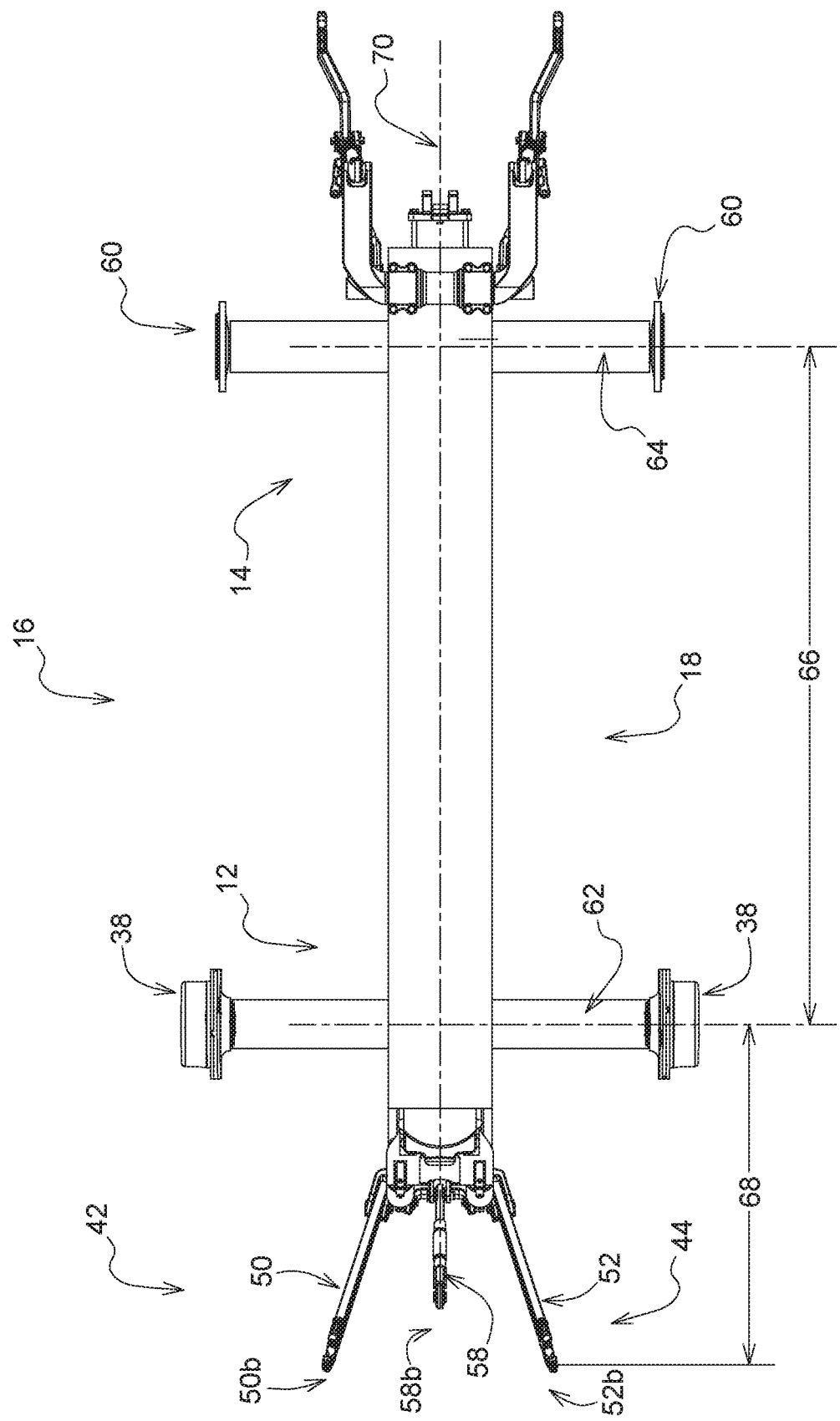
FIG. 4 is a top schematic view of the work vehicle.

FIG. 4 illustrates the front wheel hubs 38 and rear wheel hubs 60. The front wheel hubs 38 are configured to support the front wheels 20 and the rear wheel hubs 60 are configured to support the rear wheels 22. A front axle 62 extends between the front wheel hubs 38 and a rear axle 64 extends between the rear wheel hubs 60. The front axle 62 is spaced from the rear axle 64 by a first distance 66. FIG. 4 also illustrates the first and second side links 50 and 52 having the first portions 50a, 52a and the second portions 50b, 52b. A front end of the first and second side links 50 and 52 is spaced a second distance 68 from the front axle 62.

In some embodiments, a ratio of the second distance 68 to the first distance 66 (i.e., hitch distance: wheel base) is less than 0.7. In some embodiments, a ratio of the second distance 68 to the first distance 66 is less than 0.53. In some embodiments, a ratio of the second distance 68 to the first distance 66 is less than 0.49. In some embodiments, a ratio of the second distance 68 to the first distance 66 is less than 0.45.

FIG. 4 further illustrates that the work vehicle 10 has a centerline 70 extending from the front portion 12 of the work vehicle 10 to the rear portion 14 of the work vehicle 10. The centerline 70 substantially divides the first side portion 16 and the second side portion 18. The lift arm 48 and the upper link 58 are substantially positioned on the centerline 70. The first side link 50 and the first actuator 54 are positioned on a first side of the centerline 70 and the second side link 52 and the second actuator 56 are positioned on a second side of the centerline 70.

Figure 5:
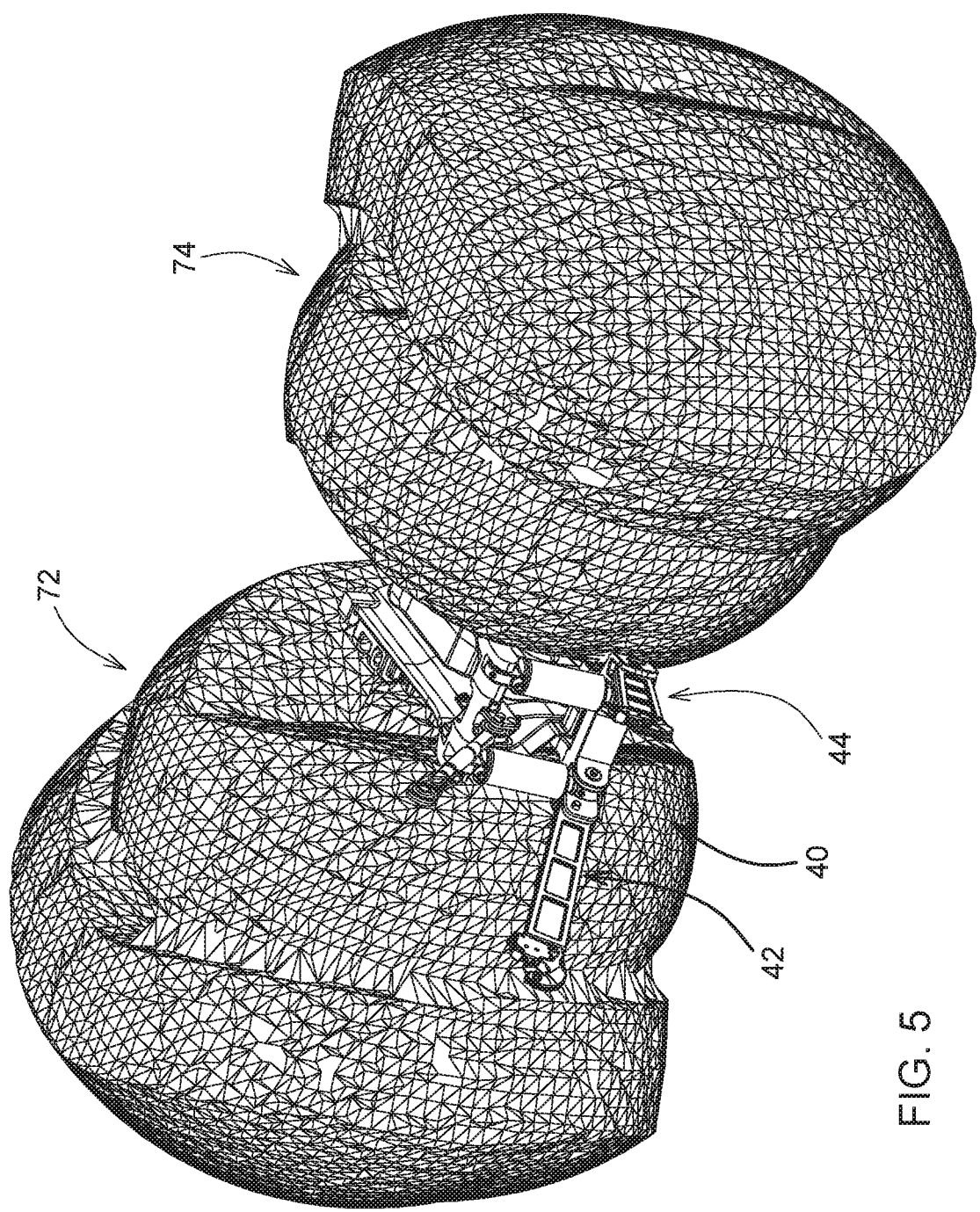
FIG. 5 is a perspective view of the portion of FIG. 3 including schematic views of tire clouds.

FIG. 5 illustrates a first movement envelope 72 and a second movement envelope 74. The first movement envelope 72 encompasses all possible locations of the front wheel 20 adjacent the first side portion 16. The first movement envelope 72 defines a first volume adjacent the first side portion 16 of the chassis 24. The first movement envelope 72 includes multiple sizes, types and configurations of ground-engaging implements that can be used in place of the front wheel 20 adjacent the first side portion 16. The first movement envelope 72 is positioned adjacent the first side 42 of the hitch assembly 40.

The second movement envelope 74 encompasses all possible locations of the front wheel 20 adjacent the second side portion 18. The second movement envelope 74 defines a second volume adjacent the second side portion 18 of the chassis 24. The second movement envelope 74 includes multiple sizes, types and configurations of ground-engaging implements that can be used in place of the front wheel 20 adjacent the second side portion 18. The second movement envelope 74 is positioned adjacent the second side 44 of the hitch assembly 40.

The first movement envelope 72 permits movement of the first ground-engaging implement 20 and the second movement envelope 74 permits movement of the second ground-engaging implement 20 such that the first work vehicle 10 has a better maneuverability than previously possible with a low ratio of the hitch distance to the wheel base. Previously, vehicles with a relatively low ratio of the hitch distance to the wheel base have had relatively poor maneuverability.

Figure 6:
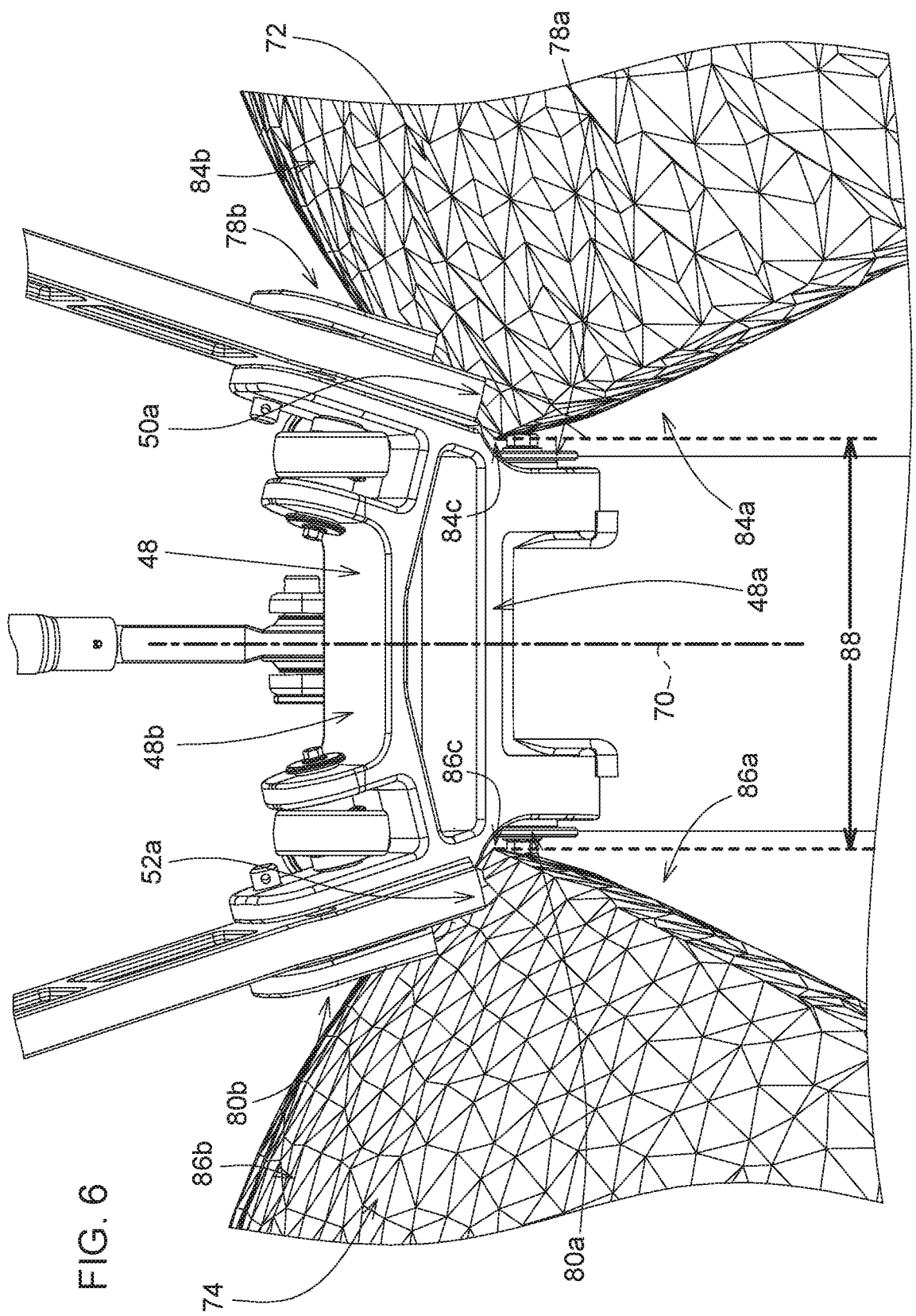
FIG. 6 is a close up bottom view of a portion of FIG. 5.

FIG. 6 is a close up bottom view of the lift arm 48, the first movement envelope 72 and the second movement envelope 74. The lift arm 48 defines a first outer surface including a first surface portion 78a and a second surface portion 78b. The first surface portion 78a of the first outer surface is adjacent the first portion 48a of the lift arm 48. The second surface portion 78b of the first outer surface is adjacent the second portion 48b of the lift arm 48.

The lift arm 48 also defines a second outer surface including a first surface portion 80a and a second surface portion 80b. The first surface portion 80a of the second outer surface is adjacent the first portion 48a of the lift arm 48. The second surface portion 80b of the second outer surface is adjacent the second portion 48b of the lift arm 48.

The first movement envelope 72 defines a surface having a first surface portion 84a and a second surface portion 84b. The first surface portion 78a is positioned adjacent the first surface portion 84a and the second surface portion 78b is positioned adjacent the second surface portion 84b. The first movement envelope 72 also defines an innermost portion 84c that is positioned closest to the centerline 70.

The first outer surface of the lift arm 48 is shaped to be spaced from the outer surface of the first movement envelope 72. Specifically, the first surface portion 78a is spaced from the first surface portion 84a, and the second surface portion 78b is spaced from the second surface portion 84b while the lift arm 48 is in any location along the range of movement of the lift arm 48. Additionally, the lift arm 48 is spaced from the innermost portion 84c at any location along the range of movement of the lift arm 48. The first portion 50a of the first side link 50 is spaced from the first surface portion 84a, the second surface portion 84b and the innermost portion 84c while the first side link 50 is at any location along the range of movement of the first side link 50.

The second movement envelope 74 defines an outer surface having a first surface portion 86a and a second surface portion 86b. The first surface portion 80a is positioned adjacent the first surface portion 86a and the second surface portion 80b is positioned adjacent the second surface portion 86b. The second movement envelope 74 also defines an innermost portion 86c that is positioned closest to the centerline 70.

The second outer surface of the lift arm 48 is shaped to be spaced from the outer surface of the second movement envelope 74. Specifically, the first surface portion 80a is spaced from the first surface portion 86a, and the second surface portion 80b is spaced from the second surface portion 86b while the lift arm 48 is in any location along the range of movement of the lift arm 48. Additionally, the lift arm 48 is spaced from the innermost portion 86c at any location along the range of movement of the lift arm 48. The first portion 52a of the second side link 52 is spaced from the first surface portion 86a, the second surface portion 86b and the innermost portion 86c while the second side link 52 is at any location along the range of movement of the second side link 52.

The innermost portion 84c of the first movement envelope 72 is spaced a minimum distance 88 from the innermost portion 86c of the second movement envelope 74. At other locations, the first movement envelope 72 is spaced a greater distance from the second movement envelope 74 than the minimum distance 88. The first portion 48a of the lift arm 48 is positioned between the first movement envelope 72 and the second movement envelope 74 at the closest point at which the minimum distance 88 is measured.

Figure 7:
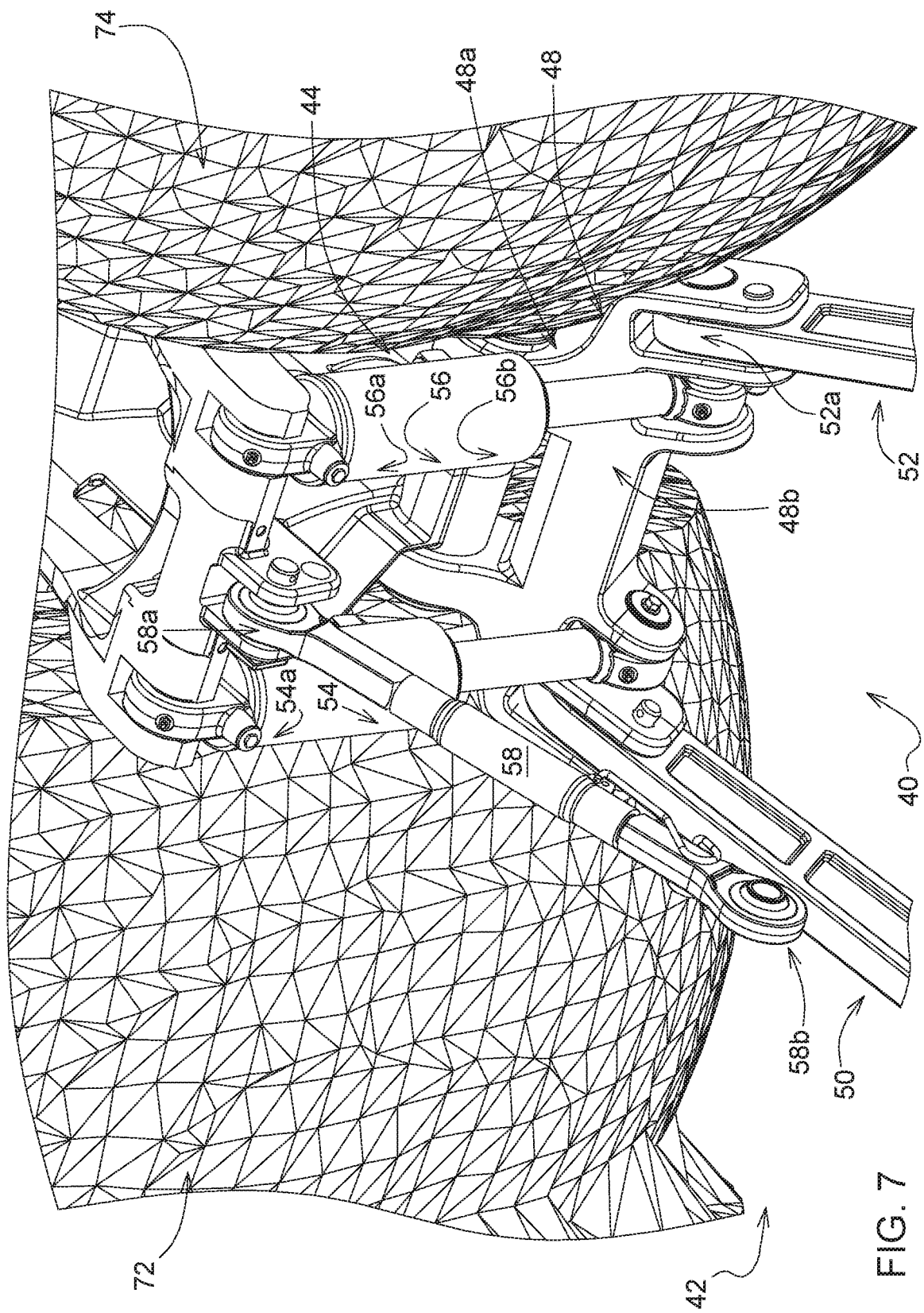
FIG. 7 is a close up perspective view of FIG. 5 with components shown in a first position.

FIG. 7 illustrates the hitch assembly 40 in the lowered position. The lift arm 48, the first side link 50, the second side link 52, the first actuator 54, the second actuator 56 and the upper link 58 are all spaced from the first movement envelope 72 and the second movement envelope 74 while the hitch assembly 40 is in the lowered position.

Figure 8:
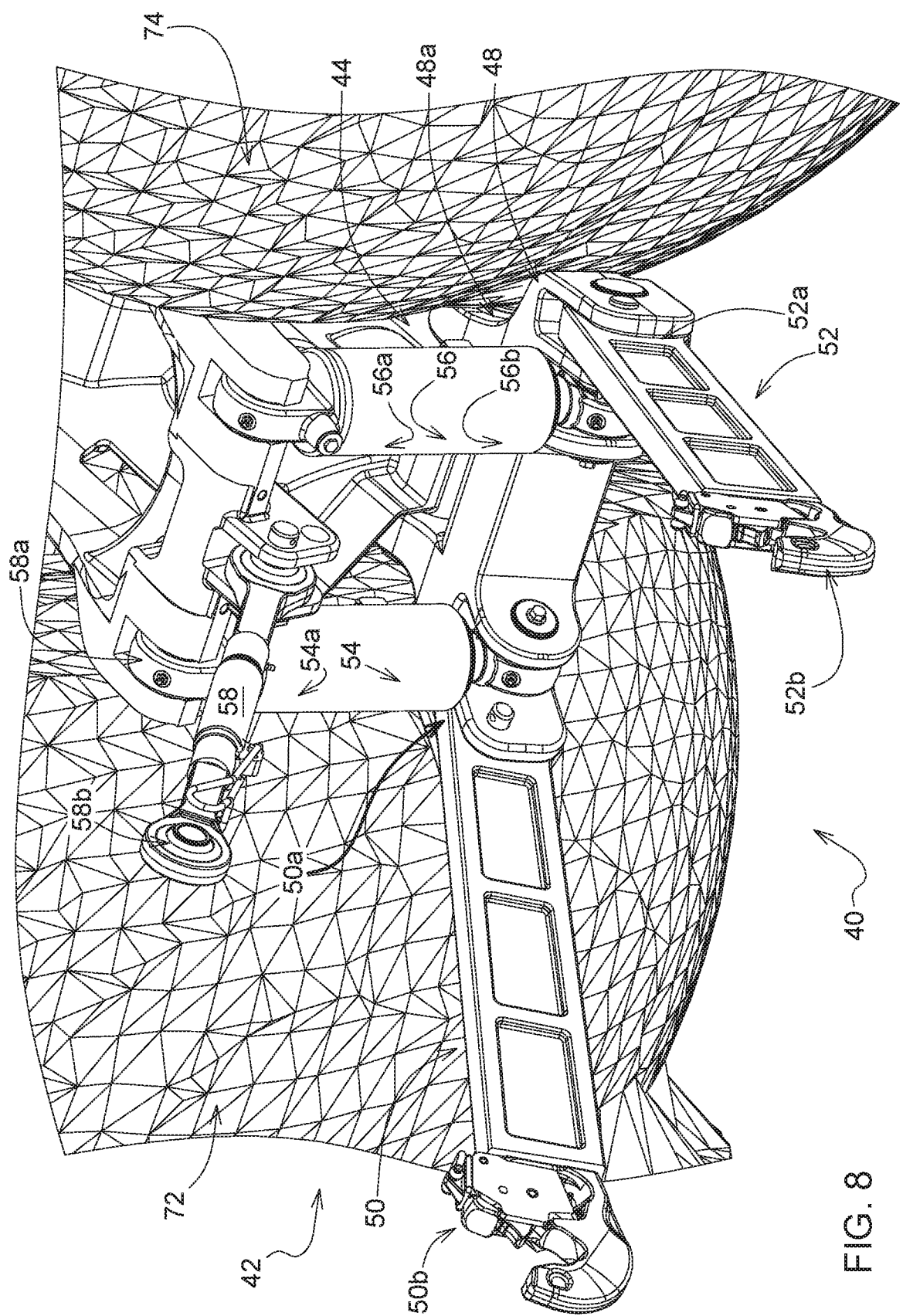
FIG. 8 is a close up perspective view of FIG. 5 with components shown in a second position.

FIG. 8 illustrates the hitch assembly 40 in the raised position. The lift arm 48, the first side link 50, the second side link 52, the first actuator 54, the second actuator 56 and the upper link 58 are all spaced from the first movement envelope 72 and the second movement envelope 74 while the hitch assembly 40 is in the raised position.

As shown in FIGS. 7 and 8, the lift arm 48 is positioned between and entirely outside of both the first movement envelope 72 and the second movement envelope 74 during the entire range of movement of the lift arm 48 between the raised position and the lowered position. The first side link 50 is positioned adjacent to and entirely outside of the first movement envelope 72 along the entire first side link range of movement, and the first actuator 54 is positioned adjacent to and entirely outside of the first movement envelope 72 along the entire first actuator range of movement. The second side link 52 is positioned adjacent to and entirely outside of the second movement envelope 74 along the entire second side link range of movement, and the second actuator is positioned adjacent to and entirely outside of the second movement envelope 74 along the entire second actuator range of movement. The first wheel 20 is permitted to move uninhibited by the lift arm 48, the first side link 50 and first actuator 54 within the first movement envelope 72. The second wheel 20 is permitted to move uninhibited by the lift arm 48, the second side link 52 and the second actuator 56 within the second movement envelope 74.

Figure 9:
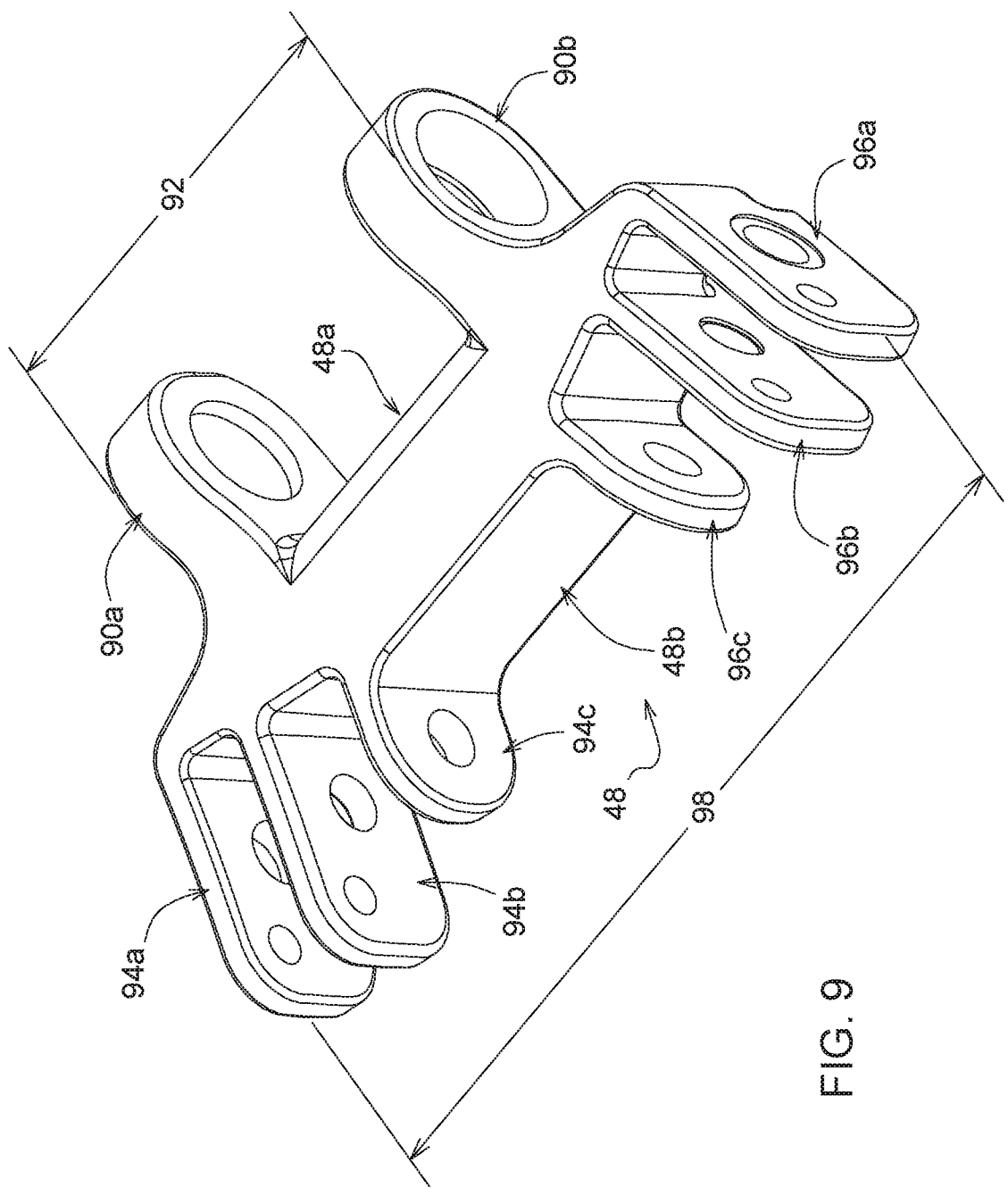
FIG. 9 is a perspective view of a bracket according to some embodiments.

FIG. 9 illustrates the lift arm 48 having the first portion 48a and the second portion 48b. The first portion 48a includes two protrusions 90a, 90b configured to engage the chassis 24. The protrusions 90a, 90b define respective apertures configured to receive one or more bearings to thereby permit the lift arm 48 to rotate with respect to the chassis 24. In some embodiments, spherical bearings are utilized to accommodate misalignment between the lift arm 48 and the chassis 24. The first portion 48a has a first width 92 extending between outside surfaces of the protrusions 90a, 90b. The first width 92 is less than the minimum distance 88 between the first movement envelope 72 and the second movement envelope 74.

The second portion 48b includes three protrusions 94a, 94b, 94c on a first side and three protrusions 96a, 96b, 96c on a second side. The protrusions 94a and 94b are configured to engage the first side link 50, and the protrusions 94b and 94c are configured to engage the first actuator 54. The protrusions 96a and 96b are configured to engage the second side link 52 and the protrusions 96b and 96c are configured to engage the second actuator 56. The second portion 48b defines a second width 98 extending between outside surfaces of the outer protrusions 94a and 96a. The second width 98 is greater than the first width 92. The second width 98 is also greater than the minimum distance 88 between the first movement envelope 72 and the second movement envelope 74.

This disclosure describes and illustrates a work vehicle having a front hitch that is relatively close to the front axle and still maintains a better maneuverability than previously possible with a low ratio of the hitch distance to the wheel base.

What is claimed is:

1. A work vehicle comprising:
   a chassis having a first side, a second side opposite the first side, a front portion and a rear portion;
   a prime mover connected to the chassis;
   a first ground-engaging implement connected to the first side of the chassis, the first ground-engaging implement configured to move within a first movement envelope with respect to the chassis;
   a second ground-engaging implement connected to the second side of the chassis, the second ground-engaging implement configured to move within a second movement envelope with respect to the chassis;
   a lift arm including a first end portion connected to the front portion of the chassis and positioned between the first ground-engaging implement and the second ground-engaging implement, and a second end portion spaced from the front portion of the chassis, the first end portion of the lift arm defining a first width and the second end portion of the lift arm defining a second width, the second width being greater than the first width, wherein the lift arm is moveable along a range of movement between a raised position and a lowered position;
   a first side link connected to a first part of the second end portion of the lift arm and extending away from the chassis, the first side link configured to engage a work implement;
   a first actuator connected to the chassis at a first end portion and connected to the first side link at a second end portion, the first actuator configured to move along a first actuator range of movement to rotate the first side link and the lift arm about the chassis, the first actuator being positioned adjacent to and entirely outside of the first movement envelope along the entire first actuator range of movement;
   a second side link connected to a second part of the second end portion of the lift arm and extending away from the chassis, the second side link configured to engage the work implement; and
   a second actuator connected to the chassis at a first end portion and connected to the second side link at a second end portion, the second actuator configured to move along a second actuator range of movement to rotate the second side link and the lift arm about the chassis, the second actuator being positioned adjacent to and entirely outside of the second movement envelope along the entire second actuator range of movement,
wherein the lift arm is entirely positioned outside of the first movement envelope within the entire range of movement between the raised position and the lowered position, such that the first ground-engaging implement is permitted to move uninhibited by the lift arm within the first movement envelope with respect to the chassis,
wherein the lift arm is permitted to move along the entire range of movement between the raised position and the lowered position without abutting the first movement envelope,
wherein the lift arm is entirely positioned outside of the second movement envelope within the entire range of movement between the raised position and the lowered position, such that the second ground-engaging implement is permitted to move uninhibited by the lift arm within the second movement envelope with respect to the chassis, and
wherein the lift arm is permitted to move along the entire range of movement between the raised position and the lowered position without abutting the second movement envelope.

2. The work vehicle of claim 1, wherein the chassis further defines a front axle positioned on the front portion of the chassis and a rear axle positioned on the rear portion of the chassis, the front axle configured to support the first ground-engaging implement and the second ground-engaging implement,
wherein a first distance is defined between the front axle and the rear axle,
wherein a second distance is defined between the front axle and the second end portion of the lift arm, and
wherein a ratio of the second distance to the first distance is less than 0.53.

3. The work vehicle of claim 2, wherein the ratio of the second distance to the first distance is less than 0.49.

4. The work vehicle of claim 3, wherein the ratio of the second distance to the first distance is less than 0.45.

5. The work vehicle of claim 2, wherein the lift arm has a first side edge facing the first movement envelope, and the first movement envelope has a side edge facing the first side edge of the lift arm, wherein the first side edge of the lift arm is spaced from the side edge of the first movement envelope while the lift arm moves along the entire range of movement of the lift arm.

6. The work vehicle of claim 5, wherein the lift arm has a second side edge facing the second movement envelope, and the second movement envelope has a side edge facing the second side edge of the lift arm, wherein the second side edge of the lift arm is spaced from the side edge of the second movement envelope while the lift arm moves along the entire range of movement of the lift arm.

7. The work vehicle of claim 2, wherein the first end portion of the lift arm defines a first width and the second end portion of the lift arm defines a second width,
wherein an innermost portion of the first movement envelope is positioned closest to a vehicle centerline and an innermost portion of the second movement envelope is positioned closest to the vehicle centerline, the innermost portion of the first movement envelope is positioned a minimum distance from the innermost portion of the second movement envelope, and
wherein the first width is less than the minimum distance and the second width is greater than the minimum distance.

8. The work vehicle of claim 1, wherein the first end portion of the lift arm defines a first width and the second end portion of the lift arm defines a second width,
wherein an innermost portion of the first movement envelope is positioned closest to a vehicle centerline and an innermost portion of the second movement envelope is positioned closest to the vehicle centerline, the innermost portion of the first movement envelope is positioned a minimum distance from the innermost portion of the second movement envelope, and
wherein the first width is less than the minimum distance and the second width is greater than the minimum distance.

9. The work vehicle of claim 1, wherein the second end portion of the lift arm includes a first side proximate the first movement envelope and a second side proximate the second movement envelope, the first side including first, second and third protrusions extending away from the chassis, a portion of the first side link positioned between the first and second protrusions, a portion of the first actuator positioned between the second and third protrusions, the second side of the second end portion of the lift arm including fourth, fifth and sixth protrusions extending away from the chassis, a portion of the second side link positioned between the fourth and fifth protrusions, a portion of the second actuator positioned between the fifth and sixth protrusions.

10. The work vehicle of claim 1, wherein the first end portion of the lift arm includes first and second protrusions extending toward the chassis and configured to engage the chassis,
wherein the second end portion includes a plurality of protrusions configured to receive respective portions of the first lift arm, the first actuator, the second lift arm and the second actuator between adjacent protrusions, and
wherein the plurality of protrusions extend at a non-parallel angle with respect to the first and second protrusions.

11. A work vehicle comprising:
a chassis having a first side, a second side opposite the first side, a front portion and a rear portion;
a prime mover connected to the chassis;
a first ground-engaging implement connected to the first side of the chassis, the first ground-engaging implement configured to move within a first movement envelope with respect to the chassis, wherein the first movement envelope defines a first volume adjacent the first side of the chassis;
a second ground-engaging implement connected to the second side of the chassis, the second ground-engaging implement configured to move within a second movement envelope with respect to the chassis, wherein the second movement envelope defines a second volume adjacent the second side of the chassis;
a lift arm including a first end portion connected to the front portion of the chassis and positioned between the first ground-engaging implement and the second ground-engaging implement, and a second end portion spaced from the front portion of the chassis, the first end portion of the lift arm defining a first width and the second end portion of the lift arm defining a second width, the second width being greater than the first width, wherein the lift arm is moveable along a range of movement between a raised position and a lowered position;

a first side link connected to a first part of the second end portion of the lift arm and extending away from the chassis, the first side link configured to engage a work implement, a first actuator connected to the chassis at a first end portion and connected to the first side link at a second end portion, the first actuator configured to move along a first actuator range of movement to rotate the first side link and the lift arm about the chassis, the first actuator being positioned adjacent to and entirely outside of the first volume along the entire first actuator range of movement, a second side link connected to a second part of the second end portion of the lift arm and extending away from the chassis, the second side link configured to engage the work implement; and a second actuator connected to the chassis at a first end portion and connected to the second side link at a second end portion, the second actuator configured to move along a second actuator range of movement to rotate the second side link and the lift arm about the chassis, the second actuator being positioned adjacent to and entirely outside of the second volume along the entire second actuator range of movement, wherein the lift arm is entirely outside of the first volume within the entire range of movement between the raised position and the lowered position, such that the first ground-engaging implement is permitted to move uninhibited by the lift arm within the first volume with respect to the chassis, wherein the lift arm is permitted to move along the entire range of movement between the raised position and the lowered position without abutting the first volume, wherein the lift arm is entirely outside of the second volume within the entire range of movement between the raised position and the lowered position, such that the second ground-engaging implement is permitted to move uninhibited by the lift arm within the second volume with respect to the chassis, and wherein the lift arm is permitted to move along the entire range of movement between the raised position and the lowered position without abutting the second volume.

12. The work vehicle of claim 11, wherein the lift arm has a first side edge facing the first volume, and the first movement envelope has a side edge facing the first side edge of the lift arm, wherein the first side edge of the lift arm is spaced from the side edge of the first volume while the lift arm moves along the entire range of movement of the lift arm.

13. The work vehicle of claim 12, wherein the lift arm has a second side edge facing the second volume, and the second movement envelope has a side edge facing the second side edge of the lift arm, wherein the second side edge of the lift arm is spaced from the side edge of the second volume while the lift arm moves along the entire range of movement of the lift arm.

14. The work vehicle of claim 11, wherein the chassis further defines a front axle positioned on the front portion of the chassis and a rear axle positioned on the rear portion of the chassis, the front axle configured to support the first ground-engaging implement and the second ground-engaging implement, wherein a first distance is defined between the front axle and the rear axle, wherein a second distance is defined between the front axle and the second end portion of the lift arm, and wherein a ratio of the second distance to the first distance is less than 0.53.

15. The work vehicle of claim 14, wherein the ratio of the second distance to the first distance is less than 0.49.

16. The work vehicle of claim 14, wherein the first end portion of the lift arm defines a first width and the second end portion of the lift arm defines a second width, wherein an innermost portion of the first movement envelope is positioned closest to a vehicle centerline and an innermost portion of the second movement envelope is positioned closest to the vehicle centerline, the innermost portion of the first movement envelope is positioned a minimum distance from the innermost portion of the second movement envelope, and wherein the first width is less than the minimum distance and the second width is greater than the minimum distance.

17. The work vehicle of claim 11, wherein the first end portion of the lift arm defines a first width and the second end portion of the lift arm defines a second width, wherein an innermost portion of the first movement envelope is positioned closest to a vehicle centerline and an innermost portion of the second movement envelope is positioned closest to the vehicle centerline, the innermost portion of the first movement envelope is positioned a minimum distance from the innermost portion of the second movement envelope, and wherein the first width is less than the minimum distance and the second width is greater than the minimum distance.

18. A work vehicle comprising:

a chassis having a first side, a second side opposite the first side, a front portion and a rear portion;

a prime mover connected to the chassis;

a first ground-engaging implement connected to the first side of the chassis, the first ground-engaging implement configured to move within a first movement envelope with respect to the chassis;

a second ground-engaging implement connected to the second side of the chassis, the second ground-engaging implement configured to move within a second movement envelope with respect to the chassis;

a lift arm including a first end portion connected to the front portion of the chassis and positioned between the first ground-engaging implement and the second ground-engaging implement, and a second end portion spaced from the front portion of the chassis, wherein the lift arm is moveable along a range of movement between a raised position and a lowered position, the lift arm positioned entirely outside of the first movement envelope and entirely outside of the second movement envelope along the entire range of movement between the raised position and the lowered position;

a first side link connected to a first part of the second end portion of the lift arm and extending away from the chassis, the first side link configured to engage a work implement, the first side link is configured to move along a first side link range of movement, the first side link being positioned adjacent to and entirely outside of the first movement envelope along the entire first side link range of movement;

a first actuator connected to the chassis at a first end portion and connected to the first side link at a second end portion, the first actuator configured to move along a first actuator range of movement to rotate the first side link and the lift arm about the chassis, the first actuator being positioned adjacent to and entirely outside of the first movement envelope along the entire first actuator range of movement;

a second side link connected to a second part of the second end portion of the lift arm and extending away from the chassis, the second side link configured to engage the work implement, the second side link is configured to move along a second side link range of movement, the second side link being positioned adjacent to and entirely outside of the second movement envelope along the entire second side link range of movement; and a second actuator connected to the chassis at a first end portion and connected to the second side link at a second end portion, the second actuator configured to move along a second actuator range of movement to rotate the second side link and the lift arm about the chassis, the second actuator being positioned adjacent to and entirely outside of the second movement envelope along the entire second actuator range of movement, wherein the first ground-engaging implement is permitted to move uninhibited by the lift arm, the first side link and first actuator within the first movement envelope, and wherein the second ground-engaging implement is permitted to move uninhibited by the lift arm, the second side link and the second actuator within the second movement envelope.

19. The work vehicle of claim 18, wherein the chassis further defines a front axle positioned on the front portion of the chassis and a rear axle positioned on the rear portion of the chassis, the front axle configured to support the first ground-engaging implement and the second ground-engaging implement, wherein a first distance is defined between the front axle and the rear axle, wherein a second distance is defined between the front axle and the second end portion of the lift arm, and wherein a ratio of the second distance to the first distance is less than 0.49.

20. The work vehicle of claim 18, wherein the first end portion of the lift arm defines a first width and the second end portion of the lift arm defines a second width, wherein an innermost portion of the first movement envelope is positioned closest to a vehicle centerline and an innermost portion of the second movement envelope is positioned closest to the vehicle centerline, the innermost portion of the first movement envelope is positioned a minimum distance from the innermost portion of the second movement envelope, and wherein the first width is less than the minimum distance and the second width is greater than the minimum distance.

* * * * *